US011336647B2

(12) United States Patent
Talwar et al.

(10) Patent No.: US 11,336,647 B2
(45) Date of Patent: May 17, 2022

(54) ERROR HANDLING FOR MEDIA ACCESS CONTROL SECURITY

(71) Applicant: Juniper Networks, Inc., Sunnyvale, CA (US)

(72) Inventors: Manish Talwar, Lunenburg, MA (US); Ajay Kachrani, Nashua, NH (US); Gert Grammel, Ditzingen (DE); Hao Wang, Kanata (CA); Tanweer Biswas, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

(21) Appl. No.: 17/038,222

(22) Filed: Sep. 30, 2020

(65) Prior Publication Data

US 2022/0103551 A1 Mar. 31, 2022

(51) Int. Cl.

*H04L 29/06* (2006.01)
*H04L 65/1069* (2022.01)

(Continued)

(52) U.S. Cl.

CPC ...... *H04L 63/0876* (2013.01); *H04L 41/0627* (2013.01); *H04L 43/16* (2013.01);

(Continued)

(58) Field of Classification Search

CPC ............ H04L 63/0876; H04L 63/0209; H04L 63/061; H04L 29/06; H04L 63/10; H04W 12/06; H04W 72/12

(Continued)

(56) References Cited

U.S. PATENT DOCUMENTS

| | | | | |
|---|---|---|---|---|
| 10,075,418 B1 * | 9/2018 | Stancik | ............... | H04L 63/0428 |
| 2008/0010233 A1 * | 1/2008 | Sack | .................. | G06F 21/6227 |

(Continued)

FOREIGN PATENT DOCUMENTS

| | | | | |
|---|---|---|---|---|
| CN | 107005831 A * | 8/2017 | .......... | H04L 67/104 |
| EP | 2530900 A2 * | 12/2012 | ............ | H04L 41/28 |

(Continued)

OTHER PUBLICATIONS

Aboba et al., "Extensible Authentication Protocol (EAP)", RFC 3748, 2004 (Year: 2004).*

(Continued)

*Primary Examiner* — Ondrej C Vostal

(74) *Attorney, Agent, or Firm* — Schwegman Lundberg & Woessner, P.A.

(57) ABSTRACT

Embodiments improve error detection and recovery in media access control security sessions. A MACsec session is torn down after three liveness time intervals elapse without receiving a MACsec key exchange protocol data unit (MKPDU) from a remote peer. This delay between a cessation of effective network communication over the MACsec session and the expiration of the three "liveness" intervals results in increased packet loss and an increased network convergence time as a network continues to route/forward data over the MACsec session for a period of time after the MACsec session has entered secure block mode. To solve this problem, embodiments define a new alarm, called a MACsec link alert, which is raised earlier than a MACsec session timeout generated by traditional embodiments. The MACsec link alert is raised, by at least some embodiments, after a failure to successfully receive an MKPDU from the remote peer after a single MACsec "liveness" timeout interval elapses.

20 Claims, 7 Drawing Sheets

600

605 START

610 ESTABLISHING A MACSEC SESSION WITH A NETWORK DEVICE OVER A NETWORK LINK, THE MACSEC SESSION INCLUDING A SESSION TIMEOUT THRESHOLD, THE SESSION TIMEOUT THRESHOLD DEFINING A MAXIMUM ELAPSED TIME ALLOWED BETWEEN RECEIPT OF TWO SEQUENTIAL MKPDU'S FROM THE NETWORK DEVICE OVER THE MACSEC SESSION

615 MONITOR AN ELAPSED TIME BETWEEN RECEIPT OF TWO SEQUENTIAL MKPKU'S FROM THE NETWORK DEVICE OVER THE MACSEC SESSION

620 COMPARE THE ELAPSED TIME WITH A PREDEFINED ALARM TIME THRESHOLD, THE ALARM TIME THRESHOLD REPRESENTING A SMALLER ELAPSED TIME THAN THE SESSION TIMEOUT THRESHOLD

625 SELECTIVELY GENERATE, BASED ON THE COMPARING, A LINK DOWN ALARM

630 END

(51) Int. Cl.
*H04L 101/622* (2022.01)
*H04L 41/0604* (2022.01)
*H04L 45/00* (2022.01)
*H04L 43/16* (2022.01)

(52) U.S. Cl.
CPC .......... *H04L 45/22* (2013.01); *H04L 61/6022* (2013.01); *H04L 63/061* (2013.01); *H04L 63/162* (2013.01); *H04L 65/1069* (2013.01)

(58) Field of Classification Search
USPC .......................................................... 713/168
See application file for complete search history.

(56) References Cited

U.S. PATENT DOCUMENTS

| | | | | |
|---|---|---|---|---|
| 2009/0182854 | A1* | 7/2009 | Sun | H04L 49/351<br>709/223 |
| 2013/0128786 | A1* | 5/2013 | Sultan | H04W 52/0238<br>370/311 |
| 2013/0301541 | A1* | 11/2013 | Mukherjee | H04W 74/0833<br>370/329 |
| 2017/0311171 | A1* | 10/2017 | Ku | H04W 48/12 |
| 2018/0302269 | A1* | 10/2018 | Sankaran | H04L 63/061 |
| 2019/0116183 | A1* | 4/2019 | Hussain | H04L 63/08 |
| 2019/0354685 | A1* | 11/2019 | Tomasso | G06F 21/575 |
| 2020/0120134 | A1* | 4/2020 | Hill | H04L 63/164 |
| 2020/0220843 | A1* | 7/2020 | Hill | H04L 45/026 |
| 2020/0358764 | A1* | 11/2020 | Hojilla Uy | H04L 9/3263 |
| 2021/0281553 | A1* | 9/2021 | Ward | H04L 63/08 |

FOREIGN PATENT DOCUMENTS

| | | | | |
|---|---|---|---|---|
| EP | 3739837 | A1 * | 11/2020 | G06F 16/2379 |
| WO | WO-2012174006 | A1 * | 12/2012 | H04L 67/145 |
| WO | WO-2017178054 | A1 * | 10/2017 | H04M 15/8214 |

OTHER PUBLICATIONS

Desai et al., "Continuing a Media Access Control Security (MACsec) Key Agreement (MKA) Session upon a Network Device Becoming Temporarily Unavailable", EP 3883205 A1, 2020 (Year: 2020).*

IEEE, "Media Access Control (MAC) Security", Std 802.1AE—2018, 2018 (Year: 2018).*

IEEE, "Port-Based Network Access Control", Std 802.1X-2010, 2010 (Year: 2010).*

Wikipedia, "IEEE 802.1AE", 2021 (Year: 2021).*

* cited by examiner

ERROR HANDLING FOR MEDIA ACCESS CONTROL SECURITY

BACKGROUND

Media Access Control (MAC) security (MACsec) manages session keys between two endpoints via the MACsec key agreement protocol (MKA). The MACsec standard specifies that MACsec Key Agreement Protocol Data Units (MKPDUs) should be exchanged between peers of a MACsec session at a particular frequency. If no MKPDU is received from a remote peer within a MKA Life Time period defined by the MACsec standard a secure data flow of the MACsec session can no longer be maintained. A router detecting this condition might time out of an interior gateway protocol (IGP) and/or a bidirectional forwarding detection (BFD) protocol.

BRIEF DESCRIPTION OF THE DRAWINGS

Example embodiments are illustrated by way of example, and not limitation, in the figures of the accompanying drawings, in which like references indicate the same or similar elements

DETAILED DESCRIPTION

Figure 1:
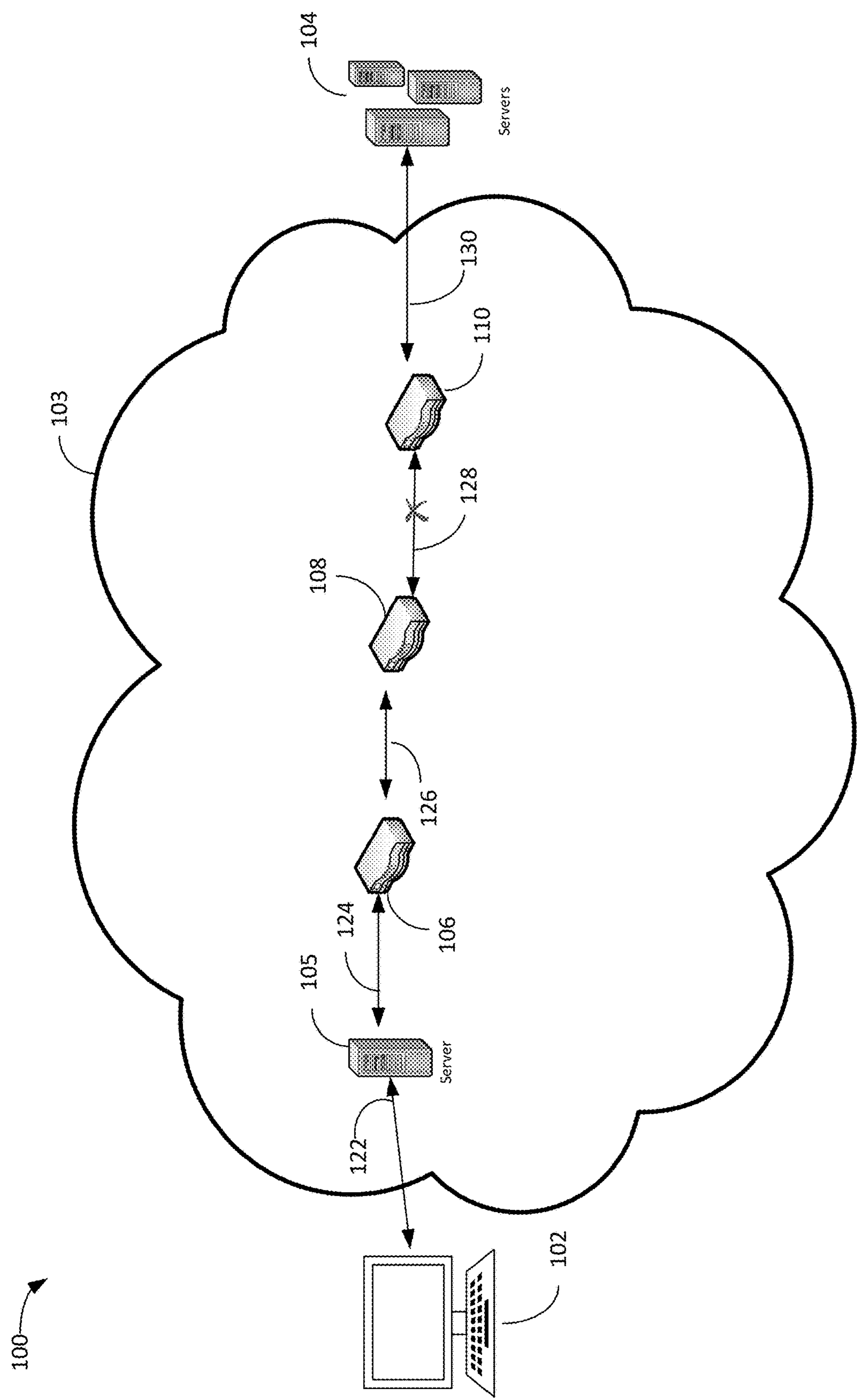
FIG. 1 is an overview diagram of a networked system implementing one or more of the disclosed embodiments.

As described above, MACsec requires that MKPDUs be exchanged between two peer devices of a MACsec session at a minimum frequency or periodic interval. If an elapsed time defined by a session timeout threshold passes without a successful receipt of a MKPDU by a device participating in the MACsec session, the MACsec session is terminated. The MACsec standard defines that a MKPDU must be received within a time period defined by an MKA Lifetime parameter. Some embodiments define this parameter as six (6) seconds.

The disclosed example embodiments recognize that functioning communication between the two endpoints of a MACsec session may effectively cease a significant time prior to the session timeout threshold being reached. During this time, network routes that include the MACsec session remain active, causing participants in network communication to route data over the MACsec session. This routing of data over a MACsec session that is no longer functional causes data buffering at both the endpoint devices of the MACsec session, as well as, in some cases, devices upstream from the endpoint devices. For example, when communication over a network path ceases, flow control windows begin to close as a result of the cessation of communication over the MACsec session. Thus, this delay between effective cessation of data communication over the MACsec session and a reliance on same by the participants, results in multiple inefficiencies across the network. For example, the resulting data buffering that occurs at the endpoint devices and upstream devices consumes memory resources that might otherwise be utilized to facilitate successful network communication. Processing resources may also be expended managing these buffered resources, and in some cases, performing retransmission of data when acknowledgments are not received. Further, the delay in rerouting around the failed MACsec session results in network anomalies at the user level. For example, video streaming may miss several seconds of video, digital telephony can be interrupted, and response times of network browsing are delayed.

To solve the technical problems associated with the delay between a cessation of effective communication over a MACsec session and a rerouting of network communication around the MACsec session, the disclosed embodiments signal a new type of alarm. The new MACsec link alert is signaled earlier than a traditional MACsec session timeout is recognized. For example, while a traditional MACsec session timeout does not occur until at least three MACsec "liveness" (e.g. MKA Hello Time or MKA Bounded Hello Time) timing intervals elapse, the new alarm is signaled after a single "liveness" interval elapses without receipt of a MKPDU message from a remote peer of a MACsec session. The disclosed embodiments recognize that even a failure to receive a MKPDU within a single MACsec "liveness" timeout interval is a signal that the MACsec session is likely to fail. By generating the new alarm earlier, the disclosed embodiments notify devices relying on the MACsec session that they should reroute their data over a different network path to ensure continuity of their communication. This earlier notification prevents excessive data buffering, timeouts, latency increases, and throughput decreases associated with compliance with the existing MACsec standard.

FIG. 1 is an overview diagram of a networked system 100 implementing one or more of the disclosed embodiments. FIG. 1 shows a source device 102 in communication, via a network 103, with a destination device 104. The source device 102 and destination device 104 communicate via a network path that includes multiple network devices, shown in FIG. 1 as a server 105, and network devices 106, 108, and 110 (shown as routers). Links between these network devices are shown as network links 122, 124, 126, 128, and 130.

At least some of the disclosed embodiments establish a media access control security (MACsec) session to provide secure communications between two adjacent network devices within the network path. For example, a MACsec session is used, in some embodiments, over network link 128 to secure communications between network device 108 and network device 110. MACsec relies on establishing encryption keys between these two devices, with the keys being used to encrypt and decrypt data carried over the network link 128. To ensure the MACsec session remains established, MACsec further requires MKPDUs to be exchanged at a particular frequency or periodically in order to maintain the MACsec session. For example, MACsec requires MKPDUs to be exchanged within an MKA Lifetime timeout period, which is, in some embodiments, six seconds. Some embodiments perform periodic transmission at an interval defined by an MKA Hello Time parameter or an MKA Bounded Hello Time parameter, which in some embodiments, is two seconds and 0.5 seconds respectively. If the MKA Lifetime timeout period passes without a successful reception of an MKPDU, the MACsec session is terminated.

While the frequency requirements of a receipt of a MKPDU within a MACsec session minimizes risk of a MACsec session, the timeout protocol defined by the MACsec standard can result in a relatively long delay between a loss of communication between two devices and a detection by one of the devices that the MACsec session has been lost. For example, in some embodiments six seconds (e.g. MKA Lifetime) may elapse before a first device participating in the session determines the session is no longer active. While the MKA Lifetime is elapsing, data is, in some cases, arriving at the first device for transmission to the second device participating in the MACsec session. Depending on the state of the session, this data is either transmitted to the second device or held at the first device. As data flow from the first device to the second device stops due to a problem with the MACsec session, data continues to arrive at the first device, and is, in at least some embodiments, buffered at the first device. Buffering of data at the first device causes, in some embodiments, the first device to close a flow control window between the first device and a device that is upstream of the first device (e.g. the network device 106). Furthermore, data buffering can occur throughput a network path between a source and destination device when the MACsec session is lost. For example, data may continue to be buffered for some time at endpoint devices, for example, when a flow control window of a transport level protocol responsible for transmission of the data closes due to a failure of end to end communication that results from the MACsec session being lost.

This excessive buffering of data wastes both network capacity and processing capacity of devices and links between the source device 102 and a point of link failure, such as the network link 128 in the above example. Furthermore, the delay between a first failure to receive a MKPDU from the second device and the disconnection of the MACsec session also delays any rerouting of data communication between the source device and the second device.

Figure 2:
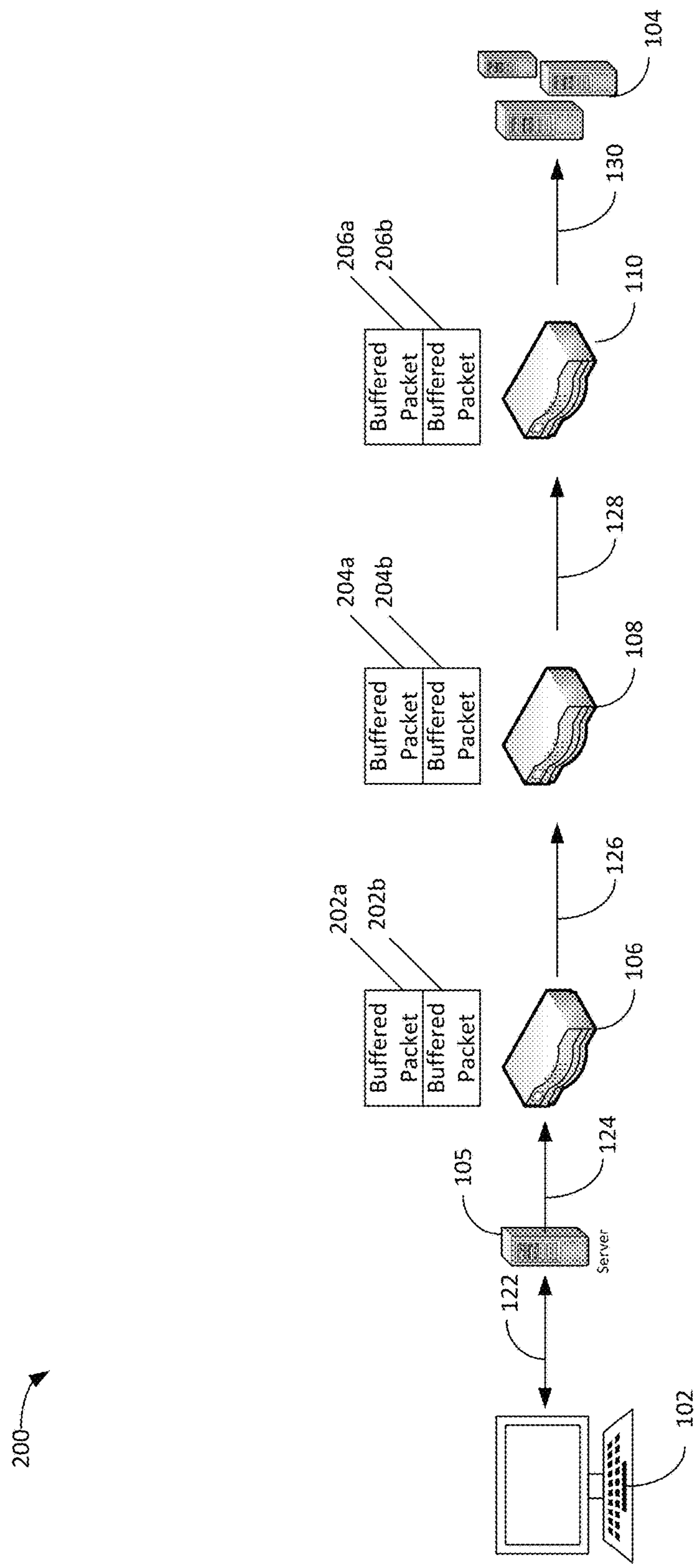
FIG. 2 shows an example of network communication over a network path that is consistent with one or more of the disclosed embodiments.

FIG. 2 shows an example of network communication over a network path 200 that is consistent with one or more of the disclosed embodiments. The example of FIG. 2 shows buffering in network devices during nominal network communication over the network path 200. FIG. 2 shows network communication in a single direction from a source device (e.g. source device 102) to a destination device (e.g., destination device 104). As understood by one of skill in the art, communication over most networks flows in multiple directions, but only a single direction is considered in the discussion of FIG. 2 to simplify the illustration and discussion.

FIG. 2 shows a typical steady state of network communication over the network path 200 and between a plurality of network devices within the network path 200. As shown, each of the network devices 106, 108, and 110 have some data buffered. Each of the network devices has buffered two packets. Network device 106 is buffering packets 202*a* and 202*b*, network device 108 is buffering packets 204*a* and 204*b*, and network device 110 is buffering packets 206*a* and 206*b*.

Figure 3:
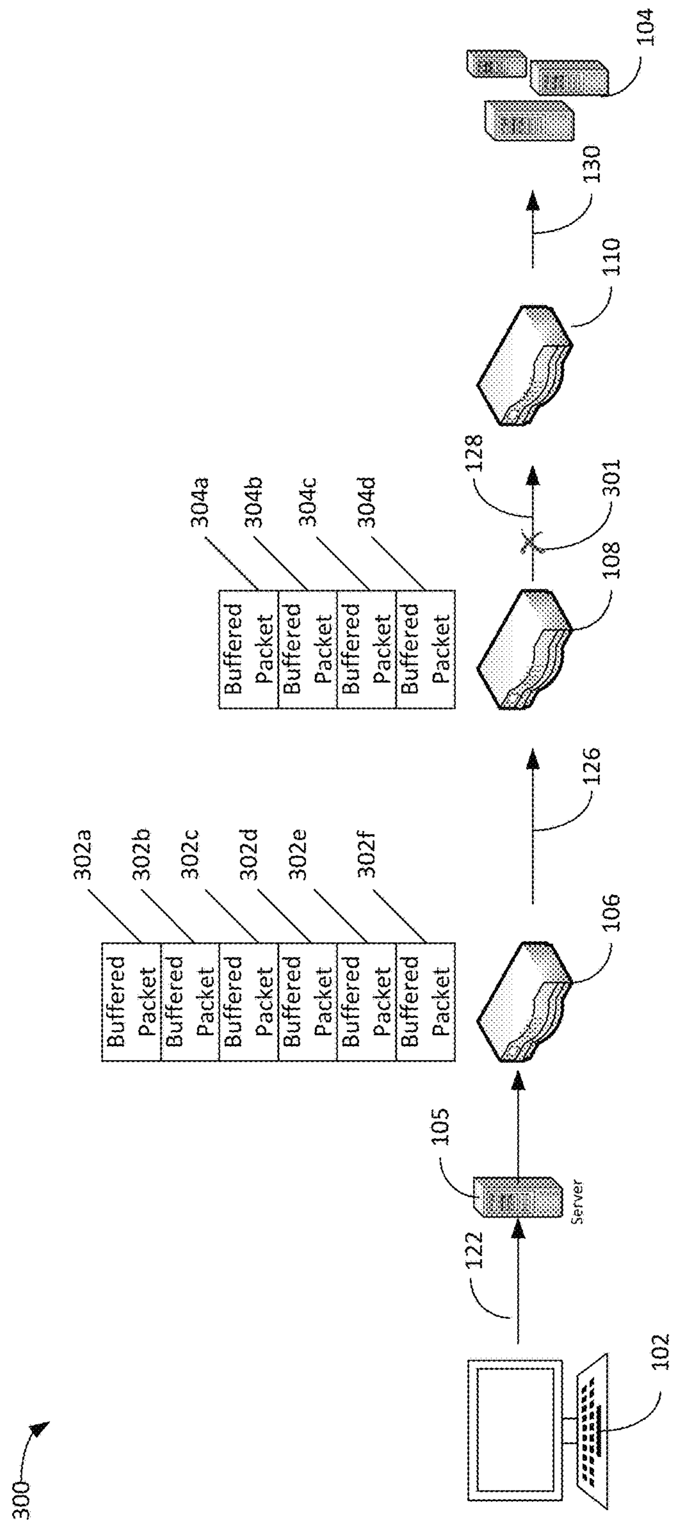
FIG. 3 shows an example of network communication over a network path that is consistent with one or more of the disclosed embodiments.

FIG. 3 shows an example of network communication over a network path 300 that is consistent with one or more of the disclosed embodiments. In contrast to the steady state environment described above with respect to FIG. 2, FIG. 3 illustrating buffering within network devices that can occur in the presence of a MACsec session failure. FIG. 3 also shows network communication from a source device (e.g. source device 102) to a destination device (e.g. destination device 104). The network communication traverses the network path 300 that includes the illustrated network devices of FIG. 3, including the network device 106, network device 108, and network device 110. FIG. 3 shows that the network link 128 has experienced a problem that results in a break 301 in communication between the network device 108 and the network device 110.

As a result in the break 301 in communication between the network device 108 and the network device 110, FIG. 3 illustrates that additional data is buffered at network devices that are upstream from the break 301, including at the network devices 106, which shows six buffered packets 302*a-f*, and the network device 108, which shows four buffered packets 304*a-d*. The buffered packets 302*a-f* and 304*a-d* result from, at least in part, the source device 102 continuing to send data into the network path 300 while the break 301 is present, which prevents any data sent by the source device 102 from reaching the destination device 104. Instead of being able to transmit the data to the network device 110, the network device 108 buffers the data locally, at least until a storage limit is reached. The network device 110 also, at least in some embodiments, closes a flow control window with the network device 106. In this case, the network device 106 is unable to send any additional data to the network device 108, resulting in buffering of data at the network device 106, which is represented by buffered packets 302*a-f*.

This buffering of data is in some cases detrimental to overall network system performance, efficiency, and customer satisfaction. For example, the buffering of data within the network path 300 results in an inefficient use of computing and network resources, in that the buffered data consumes available throughput along the network path, memory space within each of the devices in which it is buffered, and any compute power necessary to manage the buffered data. Additionally, the buffering is a signal that the end to end communication mechanism is not adequately adapting to link level conditions along the network path 300, which is at least partly a cause of the resulting inefficiency caused by the buffering.

As discussed above, the disclosed embodiments seek to minimize the data buffering and delays that result from this failure of the end to end communication mechanism to adapt to the conditions of the network link 128, as discussed further below.

Figure 4:
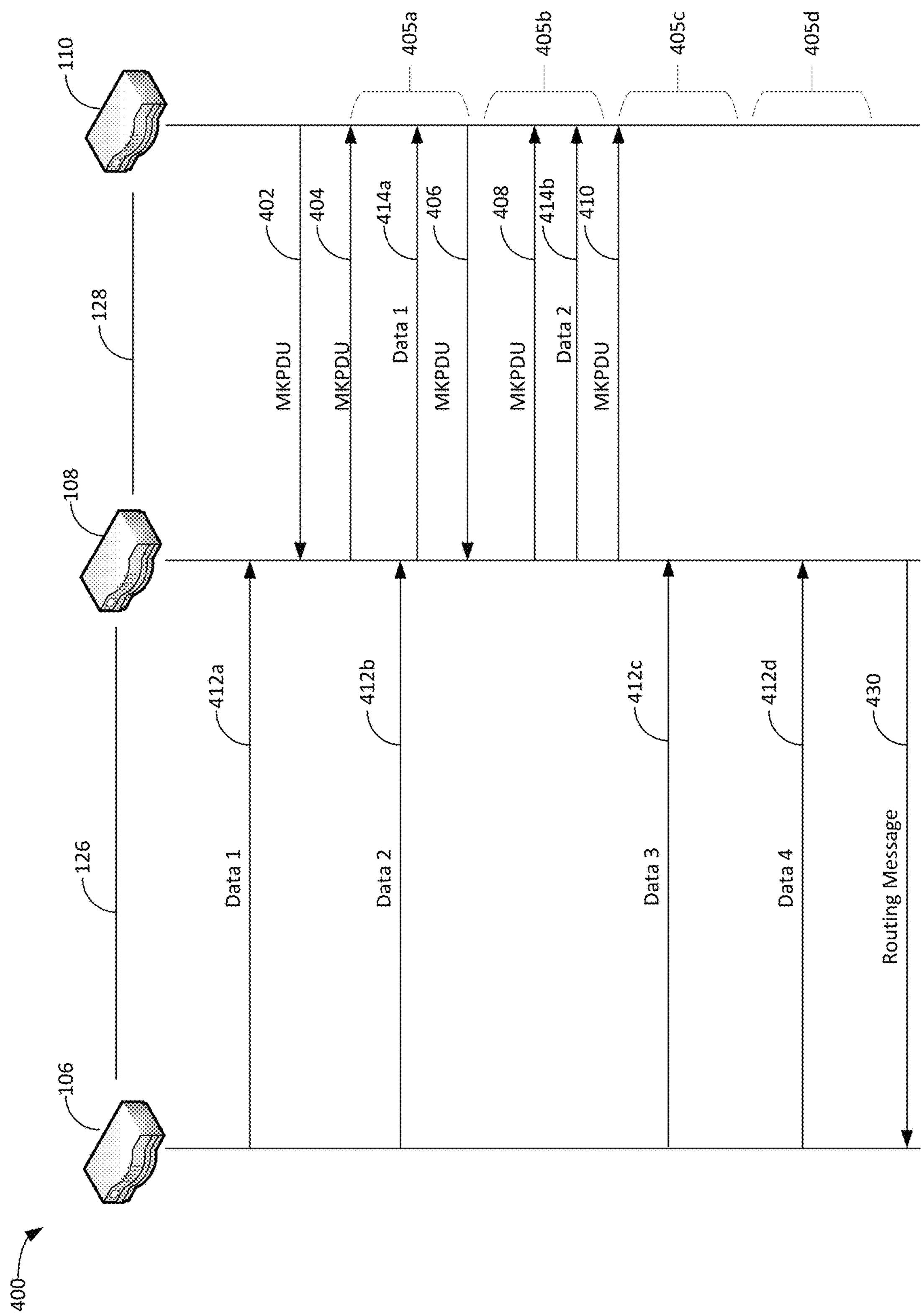
FIG. 4 is a sequence diagram showing messages exchanged between three network devices within a network path between a source device and a destination device.

FIG. 4 is a sequence diagram 400 showing messages exchanged between three network devices within a network path between a source device and a destination device. The particular example of FIG. 4 shows data messages and MKPDU messages (e.g. MACsec key agreement (MKA) protocol data units (MKPDUs)) within a MACsec session over a network link 128. FIG. 4 shows three network devices 106, 108, and 110. FIG. 4 illustrates that a data message 412*a* is transmitted from the network device 106 to the network device 108. The network device 108 and 110 have established a MACsec session over network link 128. FIG. 4 shows MKPDUs 402 and 404 are send by the network devices 108 and 110 respectively. FIG. 4 also illustrates four two second timing windows 405*a-d*. In some embodiments, each of the two second timing windows 405*a-d* represent a periodic transmission time period, defined by an MKA Hello Time or an MKA Bounded Hello Time. While the example of FIG. 4 describes each of these timing windows as two seconds in length, other embodiments vary then length of the timing windows to other periods of time.

As discussed above, some implementations of MACsec require sequential MKPDUs to be received from a second device of a MACsec session at least within an MKA Lifetime timeout window, which in at least some embodiments, is six seconds in length. If no MKPDU is received within the MKA Lifetime timeout window, the MACsec session is considered to be disconnected. Thus, FIG. 4 shows that the network devices 108 and 110 receive MKPDUs 402 and 404 respectively MKPDUs are also received by the network devices 108 and 110 as MKPDUs 406 and 408 respectively. MKPDU 406 is received from the network device 110 by the network device 108 during timing window 405*a*, and the network device 110 receives MKPDU 408 during the timing window 405*b*. As additional MKPDU 410 is shown being transmitted by the network device 108 to the network device 110. FIG. 4 also illustrates that network device 108 receives no MKPDU from the network device 110 during any of timing windows 405*b* 405*c*, or 405*d*. Because network device 108 does not receive any MKPDU from the network device 110 during three consecutive timing windows 405*b-d*, the elapsed time therefore exceeds the MKA Lifetime timeout window, and thus the network device 108 determines that the MACsec session is disconnected. In some embodiments, the timing windows 405*a-d* of FIG. 4 are MACsec "liveness" or "hello time" intervals.

FIG. 4 further illustrates that while the MKPDUs discussed above are exchanged between the network devices 108 and 110, the network device 106 continues to send data to the network device 108. This data is represented by data messages 412*b* and 412*c*. Upon receiving the data messages 412*a* and 412*b*, FIG. 4 shows that the network device 108 sends the data to the network device 110, represented as data messages 414*a* and 414*b* respectively. Upon receiving the data messages 412*c* and 412*d*, FIG. 4 illustrates that the network device 108 does not forward the data to the network device 110. In some embodiments, this is a result of a flow control window of the network device 108 closing. This can be a result of a breakdown in communication over the network link 128 between the network device 108 and network device 110, although when the data messages 412*c* and 412*d* are received by the network device 108, a problem with the network link 128 has not yet been detected. FIG. 4 further shows that upon expiration of the three consecutive time periods 405*b-d* without receiving a MKPDU from the network device 110, the network device 108 terminates the MACsec session between the network device 108 and the network device 110. As a result, the network device 108 generates a routing message 430, and transmits the routing message 430 to the upstream device, the network device 106. The routing message 430 indicates, for example, that the network link between the network device 108 and the network device 110 is inoperative. The routing message 430 is configured to cause one or more upstream devices to remove routes including the network link 128 from their routing tables, such that communication utilizes network paths that do not include the network link 128. Some embodiments generate a MACsec communication down alarm after an MKA Lifetime timeout window is exceeded without receiving a MKPDU, such as after expiration of the three "liveness" timing intervals 405*b-d*.

The disclosed embodiments recognize a technical problem exists with respect to the accumulation of data, represented by at least the data message 412*c* and the data message 412*d* after no further MKPDUs are received by the network device 108 from the network device 110. The disclosed embodiments recognize that an earlier recognition of a problem with the network link 128 between the network device 108 and the network device 110 can provide for an earlier notification to an upstream network device, such as network device 106. This will reduce the amount of data buffered within a network path between a source device (e.g. source device 102) and a destination device (e.g. destination device 104).

Figure 5:
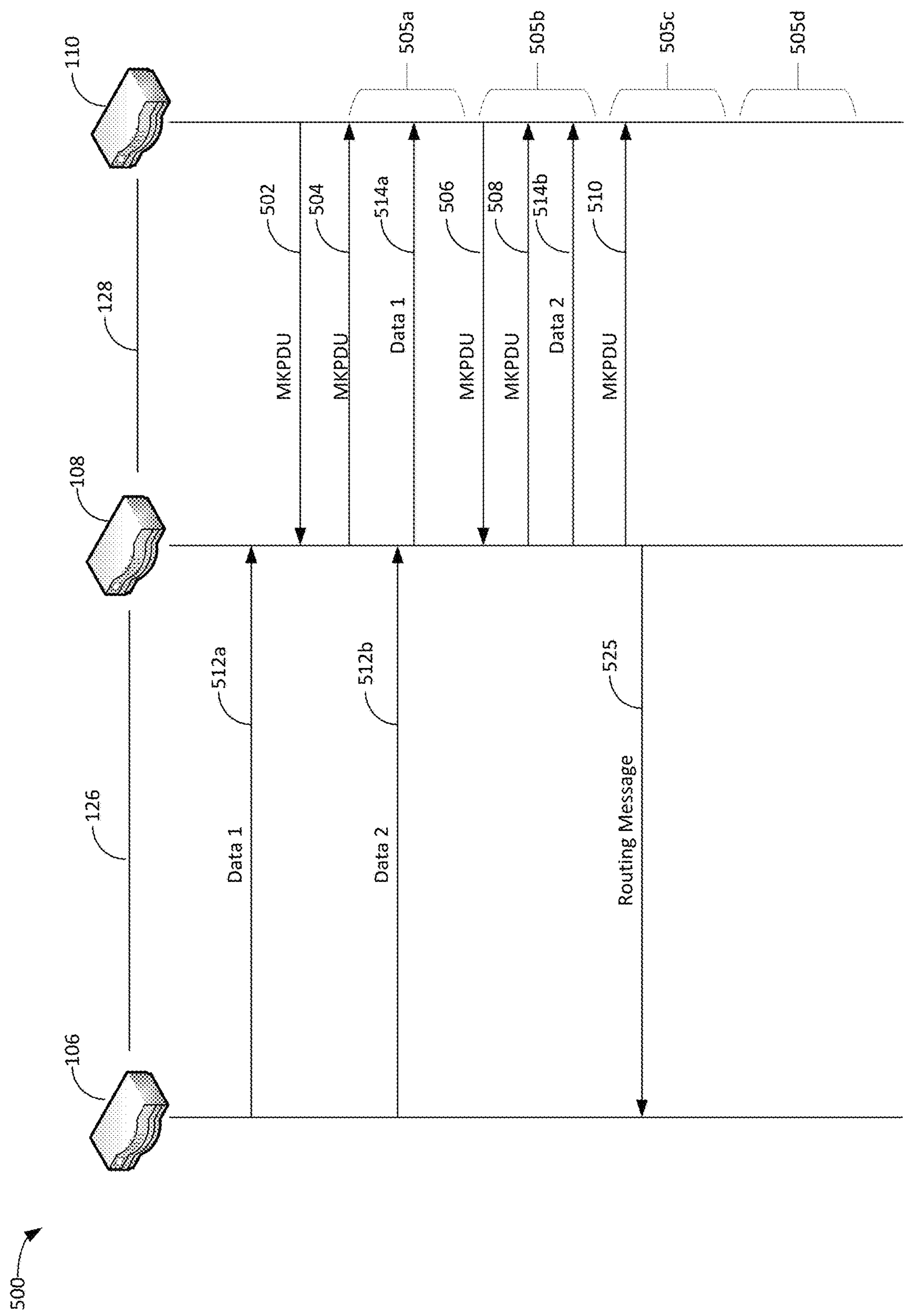
FIG. 5 is a sequence diagram showing messages exchanged between three network devices.

FIG. 5 is a sequence diagram 500 showing messages exchanged between three network devices. Network devices 108 and 110 are participants in a MACsec session. The message exchanges illustrated in FIG. 5 are similar to those in FIG. 4, but differ in at least one respect. FIG. 5 shows four consecutive elapsed time windows 505*a-d*.

Each of the elapsed time windows 505*a-d* is a MACsec MKA Hello Time or MKA Bounded Hello Time interval in some embodiments. FIG. 5 also shows MKPDUs exchanged between the network devices 108 and 110 over the network link 128. In some embodiments, the MKPDUs include a secure association key (SAK) number. The MKPDUs 502 and 504 are received by the network devices 108 and 110 respectively either during or before the timing window 505*a*. FIG. 5 also shows MKPDUs 506 and 508 are received by the network devices 108 and 110 respectively during timing window 505*b*. As the network device 108 maintains the MACsec session between the network device 108 and 110 prior to and during the timing windows 505*a* and 505*b*, the network device 108 sends data 514*a* and 514*b* to the network device 110 as a result of receiving data 512*a* and 512*b* respectively from the network device 106. In some embodiments, the MKPDUs, such as any of the messages 502, 504, 506, 508, or 510, are periodically transmitted by a source device of the message at an interval defined by the MACsec standard as an MKA Hello Time or MKA Bounded Hello Time.

In some embodiments, a participant in a MACsec session includes, in each of the MKPDUs, such as the MKPDUs 502, 504, 506, 508, or 510, a live peers list and a potential peers list. The live peers list includes all the peers that have included the participant's message identifier (MI) and a recent message number (MN) in a recent MKPDU. The potential peers list includes other peers that have transmitted an MKPDU that has been directly received by the participant or that were included in the live peers list of a MKPDU transmitted by a peer that has proved liveness. Peers are removed from each list when an interval of between MKA Lifetime and MKA lifetime plus MKA Hello Time has elapsed since the participant's recent MN was transmitted. This time is sufficient to ensure that two or more MKPDUs will have been lost or delayed prior to an incorrect removal of a live peer.

FIG. 5 shows that during the timing window 505*b*, no MKPDUs are received by the network device 108 from the network device 110. Thus, some of the disclosed embodiments generate, as a result, a routing message 525. In some embodiments, the routing message 525 is transmitted to indicate the network link 128 is no longer functional. Prior to the routing message 525, a MACsec link alert alarm is raised in some embodiments. The raising of the link warning alarm results in generation of the routing message 525, at least in some embodiments.

The network device 108 generates the routing message 525 after a failure to receive any MKPDU (e.g. including a SAK) from a remote side of the MACsec session (e.g. the network device 110). The routing message 525 is transmitted to at least an upstream device, such as the network device 106, as shown by FIG. 5. The routing message 525 is transmitted over a different network link (e.g., the network link 126) than the network link supporting the failed MACsec session (e.g. the network link 128). Upon receiving the routing message 525, the network device 106 considers that communication with the network device 108 is not possible at the present time, and may identify and utilize one or more other network paths between a source device and a destination device. By transmitting the routing message 525 upon a failure to receive a MKPDU within a single timing window (e.g. timing window 505*b*), the network device 108 is able to provide an earlier recognition that a problem exists with the MACsec session between the network device 108 and the network device 110 over the network link 128. This earlier recognition improves network convergence time, reduces packet errors and improves network throughput of devices involved in communication between the source device and the destination device.

Note that in some cases, a MKPDU is received after the link alert alarm and/or the routing message 525 is generated, but before the MKA Lifetime timeout period has expired. In some embodiments, if an MKPDU is received after the link alert alarm and/or the routing message 525 is generated, but before expiration of the MKA Life Time timeout period, the previously raised link alert alarm is cleared and/or an additional routing message is generated, with the additional routing message indicating that communication over the link is functional.

Figure 6:
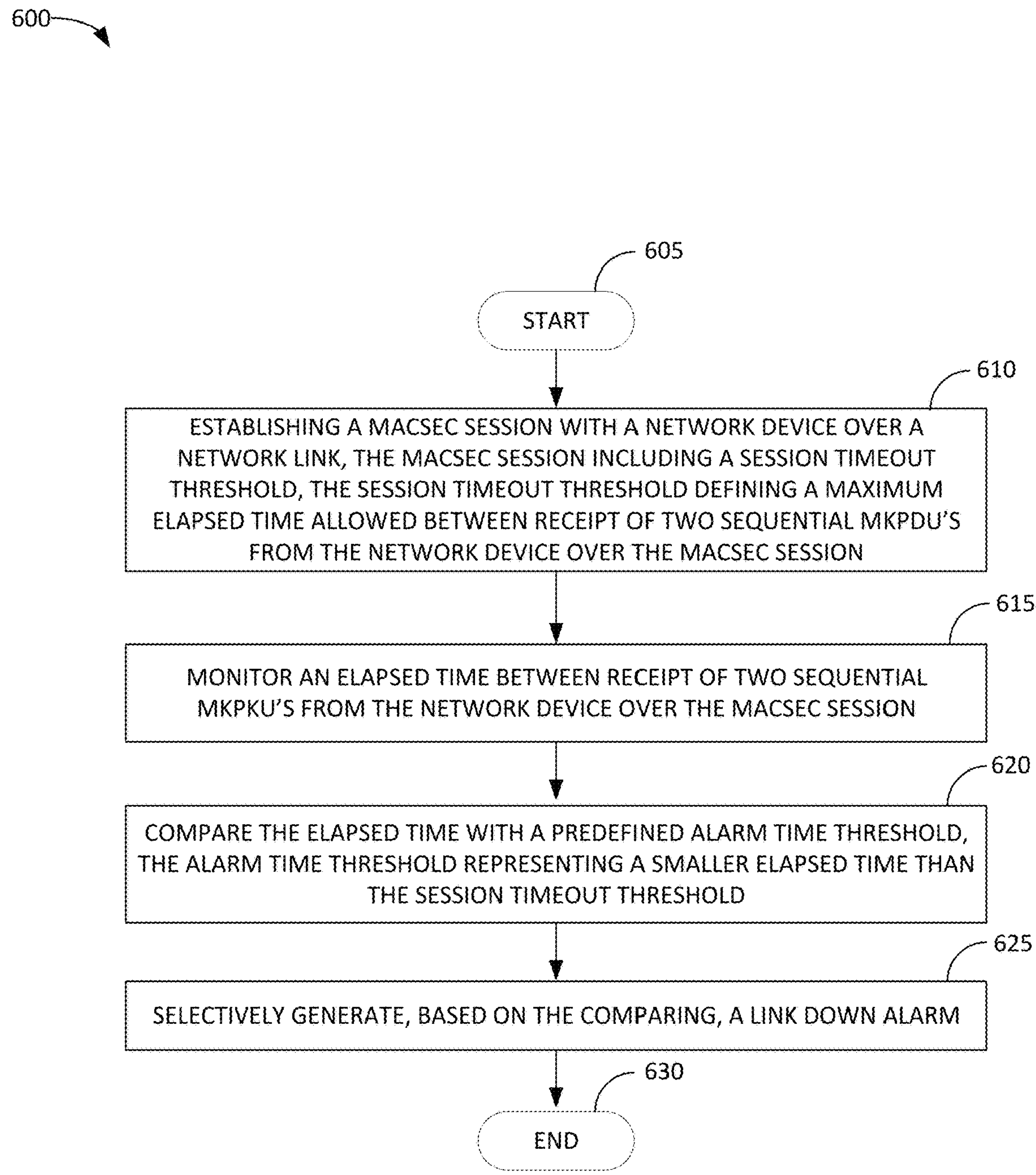
FIG. 6 is a flowchart of an example method implementing one or more of the disclosed embodiments.

FIG. 6 is a flowchart of an example method implementing one or more of the disclosed embodiments. In some embodiments, one or more of the functions discussed below with respect to the method 600 are performed by hardware processing circuitry (e.g. the processor 702 discussed below). In some embodiments, instructions (e.g. instructions 724 discussed below) are stored in an electronic memory (e.g. memory 704 and/or 706 discussed below), and when executed, configure the hardware processing circuitry to perform one or more of the functions discussed below with respect to the method 600 and/or FIG. 6. In some embodiments, the method 600 is performed by any one of the network devices 106, 108, or 110, discussed above. In the discussion below, a device executing the method 600 is referred to as an "executing device."

In some embodiments, the method 600 describes operation of a network device within a network path between two endpoint devices, such as a source device (e.g. source device 102) and a destination device (e.g. destination device 104). Network communication generally flows in both directions between the two endpoint devices, but is discussed, in some cases, with respect to a flow from a first network device to a second network device, with a MACsec session being established between the first network device and the second network device.

After start operation 605, the method 600 moves to operation 610. In operation 610, a MACsec session is established, by the first network device with the second network device over a first network link. The MACsec session includes a predefined session timeout threshold that defines a maximum elapsed time allowed between receipt of consecutive MKPDUs over the MACsec session. For example, as discussed above with respect to FIGS. 4 and 5, some embodiments track elapsed time between receipt of MKPDUs from the second device. In some embodiments, the session timeout threshold is equivalent to an MKA Lifetime parameter value defined by a MACsec standard. In some embodiments, the session timeout value is six seconds. Other embodiments utilize timing windows of a different length, such as one (1) second, 1.5 seconds, three (3) seconds, or any number of seconds or fraction of seconds. Some of these embodiments define the session timeout threshold in terms of a number of "liveness" timeout windows, or "Hello Time" windows. For example, as discussed above, some embodiments set the maximum elapsed time as equivalent to three (3) "liveness" timing windows elapsing, with each of the three (3) timing windows having a length of two (2) seconds, for a total elapsed time of six (6) seconds.

Operation 615 monitors an elapsed time between the sequential MKPDUs of the MACsec session. For example, as discussed above with respect to at least FIGS. 1 and 4-5, some embodiments require periodic communication of MKPDUs between two devices connected via a MACsec session. Operation 615 monitors an elapsed time between sequential MKPDUs received over the MACsec session. For example, operation 615 includes, in some embodiments, monitoring an amount of time between receipt, by the executing device or first device, of consecutive MKPDU messages from the second device.

In operation 620, the monitored elapsed time is compared with a predefined alarm time threshold. The alarm threshold represents a smaller amount of elapsed time than the session timeout threshold. In some embodiments, operation 620 determines if the monitored elapsed time exceeds the predefined alarm time threshold. For example, some embodiments set the predefined alarm time threshold to be equivalent to a length of a single "liveness" timing window defined by the MACsec standard (e.g. an MKA Hello Time or MKA Bounded Hello Time, which in some embodiments, are equivalent to a time period of two seconds and 0.5 seconds respectively). This single "liveness" timing window is analogous, in some embodiments, to any one of the timing windows 405*a-d* or 505*a-d*.

Operation 620 includes, in at least some embodiments transmitting a message to the second device, the message requesting the second device to utilize a new key for communication over the MACsec session. In some embodiments, the message is carried in an MKPDU. For example, the message is encoded, in some embodiments, so as to include a secure association key (SAK) number. Some embodiments of operation 620 include sequentially sending a plurality of requests to the second device, with each of the plurality of requests requesting that the second device utilize a new key for communication during the MACsec session. In some embodiments, each of the plurality of requests specifies a different new key. In some embodiments, these requests to utilize a new key are generated periodically.

Operation 625 selectively generates, based on the comparison made in operation 620, a MACsec link alert. Thus, in some embodiments, in response to the monitored elapsed time exceeding the predefined alarm time threshold, the MACsec link alert is generated. In some embodiments, the MACsec link alert is analogous to an alert or system log or error message. In these embodiments, the MACsec link alert is added to one or more system logs and generates, in some embodiments, an alert to one or more contacts configured to receive notifications of said alarm (e.g. via email, text, etc.). In some embodiments, the MACsec link alert is generated by a first software or firmware component/module, and is received by a second software/firmware component module. For example, in some embodiments, a physical layer driver or module generates the MACsec link alert and this alarm is received by, for example, a routing protocol implemented in a higher level network component. For example, in some embodiments, an IGP or BFD protocol module receives the alarm. Receipt of the alarm causes, in some embodiments, the IGP or BRD module to generate one or more routing messages indicating a route including the first network link is no longer operative.

In some embodiments, generating the MACsec link alert includes transmitting a routing message (e.g. an IGP or BFD message) over a second network link. In these embodiments, the message indicates, for example, via a predefined number or code in a particular field of the message, that the network link is not available for network communication. In some embodiments, the message is configured to cause one or more network devices to remove network paths including the network link from their routing tables.

As discussed above, in some embodiments, the executing device is connected to at least two network links. For example, as discussed above with respect to any of FIGS. 1-3, the network devices 106, 108, and 110, for example, are shown communicating over two different links. For example, network device 106 communicates over both network link 124 and network link 126. Network device 108 communicates over both network link 126 and network link 128. Network device 110 communicates over both network link 128 and network link 130. Thus, if the MACsec session was originally established over the first network link, the MACsec link alert is generated and a message transmitted over the second network link. In some embodiments, the MACsec link alert message notifies an upstream device (e.g. the network device 106 as illustrated in FIG. 3) that a network path that includes the executing device, or at least a network path that includes both the executing device and the remote device, is not usable, and thus the upstream device, at least in some embodiments, re-routes communication between the source device and the destination device over a network path that does not include the first network link.

Some embodiments establish a secure block mode session in response to generating the link alert. In some embodiments of secure block mode, any existing traffic is processed using existing data plane programming. However, in secure block mode, any new packets arriving at an interface to the network link do not use the MACsec link, at least until a new MACsec session is established Some embodiments continue to monitor the elapsed time between sequential MKPDUs, and detect when the elapsed time between sequential MKPDUs exceeds the session timeout threshold. In response to the session timeout threshold being exceeded, some embodiments terminate or close the MACsec session Some of these embodiments also generate a communication down alarm in response to the elapsed time exceeding the session timeout threshold. The communication down alarm is associated with a port or interface/network over which the communication occurs, which in the example of method 600, is the first network link. In some embodiments, the communication down alarm is generated by a physical layer component of a device, such as software and/or firmware associated with a link driver, or other physical layer code. The communication down alarm is received by a higher level component, such as a routing component. In some embodiments, in response to the communication down alarm, the routing component allows any existing packets utilizing the first network link, to drain through the first network link interface. These embodiments also generate one or more routing messages that reconfigure network devices within the network path to re-route any new data over a different path. In other words, the routing messages invalidate, in at least some embodiments, any network paths that include the first network link.

The typical data which is associated with alarm is the port or interface on which this condition occurs. Since this alarm is meant for upper layers (routing), the typical action would be to let the current packets in flight drain through the current interface but re-program the data path to re-route new packets over an alternate path (assuming it exists). Link alert alarm causes traffic to be rerouted.

In some embodiments, an alert is generated in response to a communication down alarm. The alert is received, for example, by a network operators, which, in some cases, prompts a corrective action. Some embodiments monitor for a communication down alarm after a link alert is generated, if no communication down alarm is received/generated within a predefined time period after the link alert, the link alert is reset or otherwise erased. In some cases, a MKPDU is received before the MKA Lifetime period, thus indicating the MACsec session is still intact. In this case, an additional routing message is generated, in at least some embodiments, with the additional routing message indicating that the first network link is functional again.

After operation 625 completes, method 600 moves to end operation 630.

Figure 7:
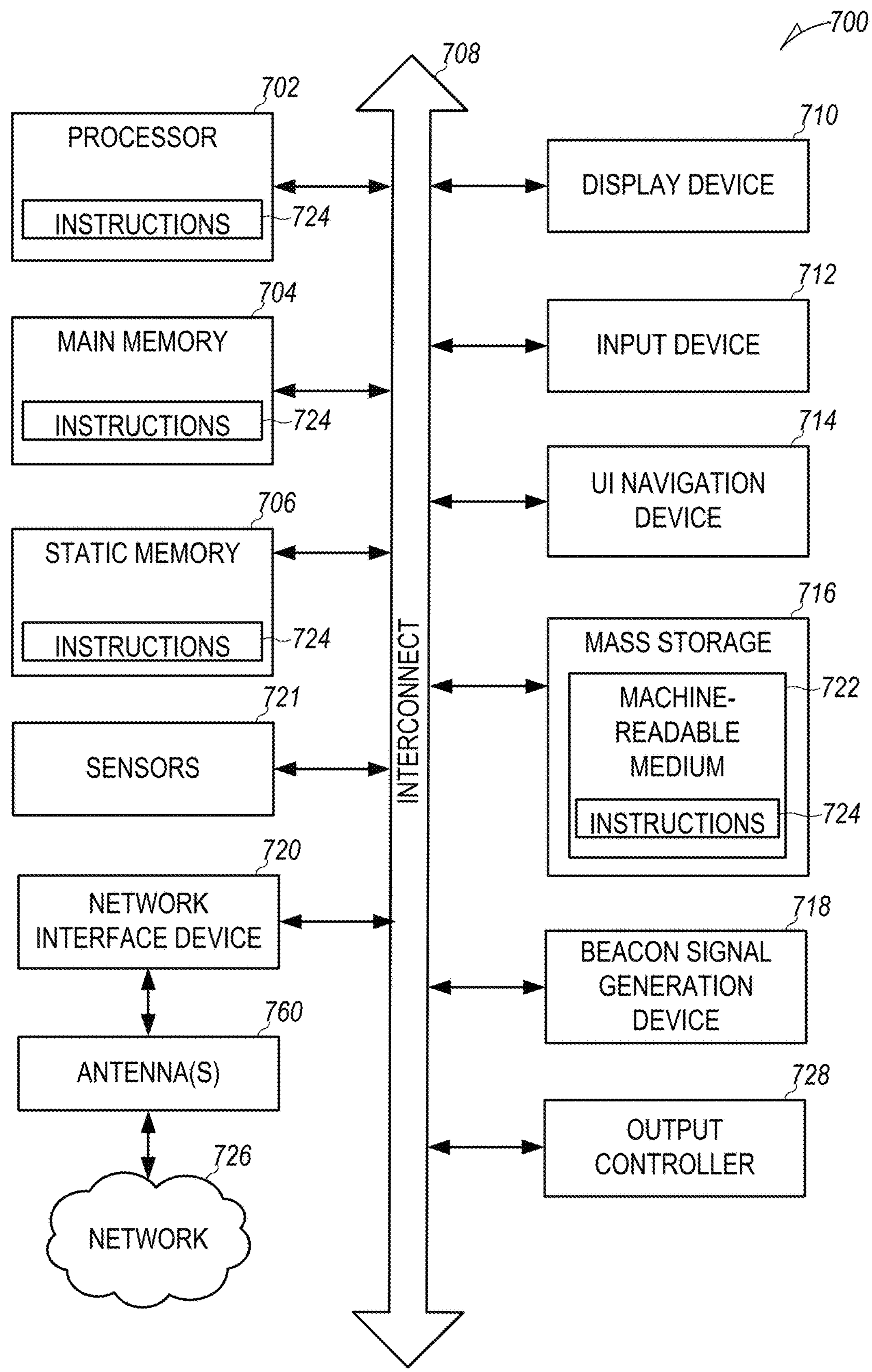
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. Machine 700 (e.g., computer system) may include a hardware processor 702 (e.g., a central processing unit (CPU), a graphics processing unit (GPU), a hardware processor core, or any combination thereof), a main memory 704 and a static memory 706, some or all of which may communicate with each other via an interlink 708 (e.g., bus).

Specific examples of main memory 704 include Random Access Memory (RAM), and semiconductor memory devices, which may include, in some embodiments, storage locations in semiconductors such as registers. Specific examples of static memory 706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage device (e.g., drive unit) 716, a beacon signal generation device 718, a network interface device 720, and one or more sensors 721, such as a global positioning system (GPS) sensor, compass, accelerometer, or another sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 702 and/or instructions 724 may comprise processing circuitry and/or transceiver circuitry.

The mass storage device 716 may include a machine readable medium 722 on which is stored one or more sets of data structures or instructions 724 (e.g., software) embodying or utilized by any one or more of the techniques or functions described herein. The machine readable medium 722 is a non-transitory computer readable storage medium in at least some embodiments. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage device 716 may constitute machine readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 722 is illustrated as a single medium, the term "machine readable medium" may include a single medium or multiple media (e.g., a centralized or distributed database, and/or associated caches and servers) configured to store the instructions 724.

An apparatus of the machine 700 may be one or more of a hardware processor 702 (e.g., a central processing unit (CPU), a graphics processing unit (GPU), a hardware processor core, or any combination thereof), one or more hardware memories, including one or more of a main memory 704 and a static memory 706. The apparatus of the machine 700 also includes, in some embodiments, one or more sensors 721, network interface device 720, one or more antennas 760, a display device 710, an input device 712, a UI navigation device 714, a mass storage device 716, instructions 724, a beacon signal generation device 718, and an output controller 728. The apparatus may be configured to perform one or more of the methods and/or operations disclosed herein. The apparatus may be intended as a component of the machine 700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 720 may include one or more physical jacks (e.g., Ethernet, coaxial, or phone jacks) or one or more antennas to connect to the communications network 726. In an example, the network interface device 720 may include one or more antennas 760 to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a method, comprising: establishing, by a first network device, a media access control security (MACsec) session with a second network device over a first network link, the MACsec session including a predefined session timeout threshold, the session timeout threshold defining a maximum elapsed time between receipt of two sequential MACsec Key Agreement Protocol Data Units (MKPDUs) from the second network device over the MACsec session; monitoring an elapsed time between receipt of two sequential MKPDUs from the network device over the MACsec session; comparing the elapsed time with a predefined alarm time threshold, the predefined alarm time threshold representing a smaller elapsed time than the session timeout threshold; and selectively generating, based on the comparing, a MACsec link alert.

In Example 2, the subject matter of Example 1 optionally includes wherein the predefined session timeout threshold is equivalent to an MKA Lifetime.

In Example 3, the subject matter of any one or more of Examples 1-2 optionally include wherein the predefined alarm time threshold is an MKA Hello Time or an MKA Bounded Hello Time.

In Example 4, the subject matter of any one or more of Examples 1-3 optionally include entering secure block mode in response to generating the MACsec link alert.

In Example 5, the subject matter of any one or more of Examples 1-4 optionally include wherein the MACsec link alert is generated in response to the elapsed time exceeding the alarm time threshold.

In Example 6, the subject matter of any one or more of Examples 1-5 optionally include wherein the generating of the MACsec link alert occurs while the MACsec session remains established.

In Example 7, the subject matter of any one or more of Examples 1-6 optionally include second determining the elapsed time exceeds the session timeout threshold; terminating the MACsec session over the first network link in response to the second determining; and generating a communication down alarm.

In Example 8, the subject matter of any one or more of Examples 6-7 optionally include generating a MACsec communication down alarm in response to expiration of the maximum elapsed time without receiving a MKPDU from the second network device over the MACsec session.

In Example 9, the subject matter of any one or more of Examples 1-8 optionally include wherein the generating of the MACsec link alert comprises transmitting a network message indicating the MACsec link alert to a third network device, wherein the network message is configured to cause the third network device to stop routing data over a network path that includes the first network link before the elapsed time exceeds the timeout threshold.

In Example 10, the subject matter of any one or more of Examples 8-9 optionally include wherein the transmitting of the network message transmits the network message over a second network link to the third network device.

Example 11 is a system, comprising: hardware processing circuitry; one or more hardware memories storing instructions that when executed configure the hardware processing circuitry to perform operations comprising: establishing, by a first network device, a media access control security (MACsec) session with a second network device over a first network link, the MACsec session including a predefined session timeout threshold, the session timeout threshold defining a maximum elapsed time between receipt of two sequential MACsec Key Agreement Protocol Data Units (MKPDUs) from the second network device over the MACsec session; monitoring an elapsed time between receipt of two sequential MKPDU's from the network device over the MACsec session; comparing the elapsed time with a predefined alarm time threshold, the predefined alarm time threshold representing a smaller elapsed time than the session timeout threshold; and selectively generating, based on the comparing, a MACsec link alert.

In Example 12, the subject matter of any one or more of Examples 10-11 optionally include wherein the predefined session timeout threshold is equivalent to an MKA Lifetime.

In Example 13, the subject matter of any one or more of Examples 10-12 optionally include wherein the predefined alarm time threshold is an MKA Hello Time or an MKA Bounded Hello Time.

In Example 14, the subject matter of any one or more of Examples 10-13 optionally include wherein the MACsec link alert is generated in response to the elapsed time exceeding the alarm time threshold.

In Example 15, the subject matter of any one or more of Examples 10-14 optionally include wherein the generating of the MACsec link alert occurs while the MACsec session remains established.

In Example 16, the subject matter of any one or more of Examples 10-15 optionally include the operations further comprising: second determining the elapsed time exceeds the session timeout threshold; and terminating the MACsec session over the first network link in response to the second determining.

In Example 17, the subject matter of any one or more of Examples 15-16 optionally include the operations further comprising generating a MACsec communication down alarm in response to expiration of the maximum elapsed time without receiving a MKPDU from the second network device over the MACsec session.

In Example 18, the subject matter of any one or more of Examples 10-17 optionally include wherein the generating of the MACsec link alert comprises transmitting a network message indicating the MACsec link alert to a third network device, wherein the network message is configured to cause the third network device to stop routing data over a network path that includes the first network link before the elapsed time exceeds the timeout threshold.

Example 19 is a non-transitory computer readable storage medium comprising instructions that when executed configure hardware processing circuitry to perform operations comprising: establishing, by a first network device, a media access control security (MACsec) session with a second network device over a first network link, the MACsec session including a predefined session timeout threshold, the session timeout threshold defining a maximum elapsed time between receipt of two sequential MACsec Key Agreement Protocol Data Units (MKPDUs) from the second network device over the MACsec session; monitoring an elapsed time between receipt of two sequential MKPDU's from the network device over the MACsec session; comparing the elapsed time with a predefined alarm time threshold, the predefined alarm time threshold representing a smaller elapsed time than the session timeout threshold; and selectively generating, based on the comparing, a MACsec link alert.

In Example 20, the subject matter of Example 19 optionally includes wherein the predefined session timeout threshold is equivalent to an MKA Lifetime, and the predefined alarm time threshold is an MKA Hello Time or an MKA Bounded Hello Time.

The invention claimed is:

1. A method, comprising:

establishing, by a first network device, a media access control security (MACsec) session with a second network device over a first network link, the MACsec session including a predefined session timeout threshold;

monitoring an elapsed time between receipt of consecutive MACsec Key Agreement Protocol Data Units (MKPDUs) MKPDUs from the second network device over the MACsec session, wherein the session timeout threshold defines a maximum elapsed time allowed between the receipt of any consecutive MKPDUs over the MACsec session;

comparing the elapsed time with a predefined alarm time threshold, the predefined alarm time threshold representing a smaller elapsed time than the session timeout threshold; and selectively generating, based on the comparing, a MACsec link alert.

2. The method of claim 1, wherein the predefined session timeout threshold is equivalent to an MKA Lifetime.

3. The method of claim 1, wherein the predefined alarm time threshold is an MKA Hello Time or an MKA Bounded Hello Time.

4. The method of claim 1, further comprising entering secure block mode in response to generating the MACsec link alert.

5. The method of claim 1, wherein the MACsec link alert is generated in response to the elapsed time exceeding the alarm time threshold.

6. The method of claim 1, wherein the generating of the MACsec link alert occurs while the MACsec session remains established.

7. The method of claim 1, further comprising:

second determining the elapsed time exceeds the session timeout threshold;

terminating the MACsec session over the first network link in response to the second determining; and generating a communication down alarm.

8. The method of claim 6, further comprising generating a MACsec communication down alarm in response to expiration of the maximum elapsed time without receiving a MKPDU from the second network device over the MACsec session.

9. The method of claim 1, wherein the generating of the MACsec link alert comprises transmitting a network message indicating the MACsec link alert to a third network device, wherein the network message is configured to cause the third network device to stop routing data over a network path that includes the first network link before the elapsed time exceeds the timeout threshold.

10. The method of claim 8, wherein the transmitting of the network message transmits the network message over a second network link to the third network device.

11. A system, comprising:

hardware processing circuitry;

one or more hardware memories storing instructions that when executed configure the hardware processing circuitry to perform operations comprising:

establishing, by a first network device, a media access control security (MACsec) session with a second network device over a first network link, the MACsec session including a predefined session timeout threshold;

monitoring an elapsed time between receipt of consecutive MACsec Key Agreement Protocol Data Units (MKPDUs) from the second network device over the MACsec session, wherein the session timeout threshold defines a maximum elapsed time allowed between the receipt of any consecutive MKPDUs over the MACsec session;

comparing the elapsed time with a predefined alarm time threshold, the predefined alarm time threshold representing a smaller elapsed time than the session timeout threshold; and selectively generating, based on the comparing, a MACsec link alert.

12. The system of claim 11, wherein the predefined session timeout threshold is equivalent to an MKA Lifetime.

13. The system of claim 11, wherein the predefined alarm time threshold is an MKA Hello Time or an MKA Bounded Hello Time.

14. The system of claim 11, wherein the MACsec link alert is generated in response to the elapsed time exceeding the alarm time threshold.

15. The system of claim 11, wherein the generating of the MACsec link alert occurs while the MACsec session remains established.

16. The system of claim 11, the operations further comprising:

second determining the elapsed time exceeds the session timeout threshold; and terminating the MACsec session over the first network link in response to the second determining.

17. The system of claim 15, the operations further comprising generating a MACsec communication down alarm in response to expiration of the maximum elapsed time without receiving a MKPDU from the second network device over the MACsec session.

18. The system of claim 11, wherein the generating of the MACsec link alert comprises transmitting a network message indicating the MACsec link alert to a third network device, wherein the network message is configured to cause the third network device to stop routing data over a network path that includes the first network link before the elapsed time exceeds the timeout threshold.

19. A non-transitory computer readable storage medium comprising instructions that when executed configure hardware processing circuitry to perform operations comprising:

establishing, by a first network device, a media access control security (MACsec) session with a second network device over a first network link, the MACsec session including a predefined session timeout threshold;

monitoring an elapsed time between receipt of consecutive MACsec Key Agreement Protocol Data Units (MKPDUs) from the second network device over the MACsec session, wherein the session timeout threshold defines a maximum elapsed time allowed between the receipt of any sequential MKPDUs over the MACsec session;

comparing the elapsed time with a predefined alarm time threshold, the predefined alarm time threshold representing a smaller elapsed time than the session timeout threshold; and selectively generating, based on the comparing, a MACsec link alert.

20. The non-transitory computer readable storage medium of claim 19, wherein the predefined session timeout threshold is equivalent to an MKA Lifetime, and the predefined alarm time threshold is an MKA Hello Time or an MKA Bounded Hello Time.

* * * * *